United States Patent [19]
Haworth et al.

[11] Patent Number: 5,346,621
[45] Date of Patent: Sep. 13, 1994

[54] HOLLOW FIBER BLOOD OXYGENATOR

[75] Inventors: William S. Haworth, White Bear Lake; Robert W. Olsen, Plymouth; Mark S. Goodin, Medina; Larry E. Fuller, Plymouth, all of Minn.

[73] Assignee: Avecor Cardiovascular, Inc., Plymouth, Minn.

[21] Appl. No.: 63,996

[22] Filed: May 19, 1993

[51] Int. Cl.$^5$ .............. B01D 11/00; B01D 61/00; A61M 1/14; A61M 1/34
[52] U.S. Cl. .................... 210/645; 422/46; 422/48
[58] Field of Search ........... 422/48, 46; 210/321.8, 210/321.85, 645; 95/45, 54, 51

[56] References Cited

U.S. PATENT DOCUMENTS

| | | | |
|---|---|---|---|
| 3,422,008 | 1/1969 | McLain | 422/48 |
| 3,794,468 | 2/1974 | Leonard | 422/48 |
| 4,424,190 | 1/1984 | Mather, III et al. | 422/46 |
| 4,639,353 | 1/1987 | Takemura et al. | 422/46 |
| 4,690,758 | 9/1987 | Leonard et al. | 210/247 |
| 4,902,416 | 2/1990 | Schroeder et al. | 210/321.67 |
| 4,975,247 | 12/1990 | Badolato et al. | 422/48 |
| 5,026,479 | 6/1991 | Bikson et al. | 210/321.8 |
| 5,240,677 | 8/1993 | Jones et al. | 422/46 |

FOREIGN PATENT DOCUMENTS

187708B1  8/1992  European Pat. Off.

Primary Examiner—Nina Bhat
Attorney, Agent, or Firm—Thomas E. Popovich; David B. Edgeworth

[57] ABSTRACT

A radial flow hollow fiber blood oxygenator is provided. The oxygenator includes a hollow fiber bundle within an oxygenator chamber defined by a hollow core around which the hollow fibers are wound and an outer housing. A gas entry port is coupled to the interior of the fibers adjacent one end of the bundle and a gas outlet is coupled to the interior of the fibers at the opposite end of the bundle. A blood inlet to the core is provided adjacent one end of the bundle, and a blood outlet from the chamber is provided adjacent the same end of the bundle. The direction of blood flow through the chamber is generally radial and the oxygenator includes an inlet manifold and an outlet manifold.

12 Claims, 4 Drawing Sheets

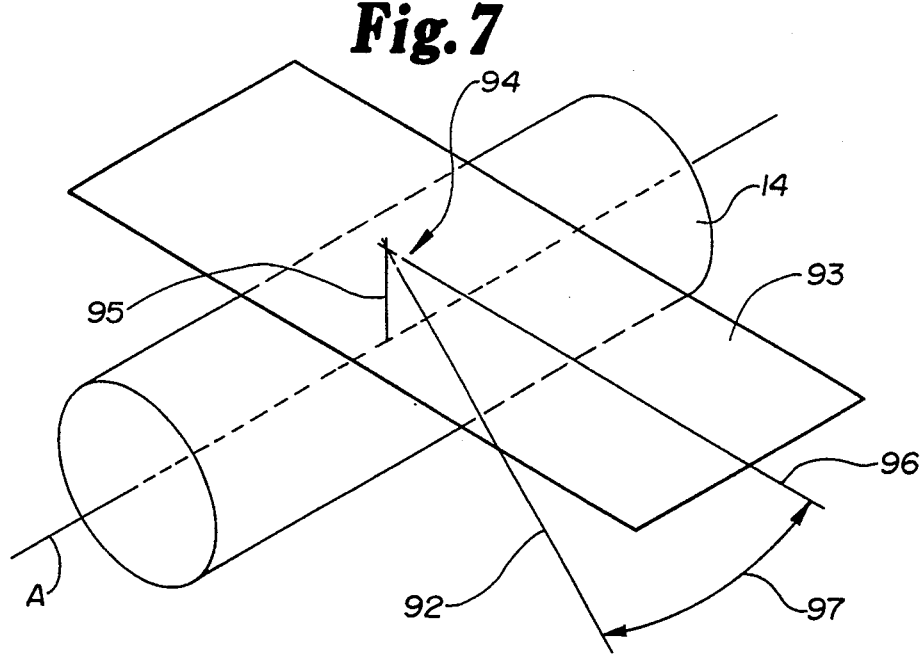
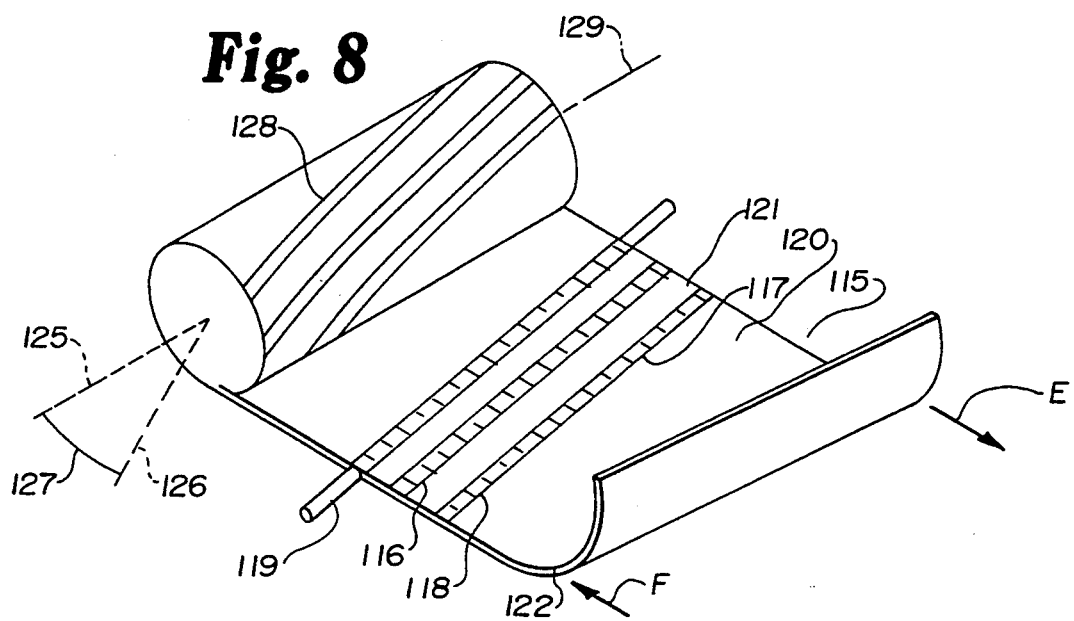
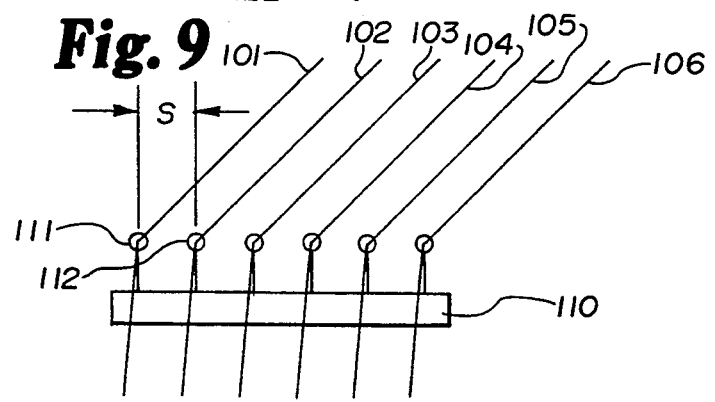

HOLLOW FIBER BLOOD OXYGENATOR

FIELD OF THE INVENTION

The present invention relates to mass transfer devices. In particular, it relates to a radial flow hollow fiber blood oxygenator including a fiber bundle, a central core for supporting the bundle and an outer housing, wherein the core, bundle and housing are generally cylindrical and concentrically arranged, and wherein a blood providing inlet manifold is positioned between the core and the bundle and a blood collecting outlet manifold is positioned between the bundle and the housing.

BACKGROUND OF THE INVENTION

Permeability separatory apparatus or mass transfer devices, including blood oxygenator systems, have been known for some time. U.S. Pat. No. 3,422,008 (to McLain) discloses permeability separatory apparatus and the process of manufacture and use of such apparatus. Hollow fibers of a selectively permeable membrane are wound around a cylindrical core or along a substantial portion of the length of the core. The core is perforated or porous along its length or a substantial portion thereof so a fluid can pass from the interior of the core around or through the fibers wound on the core. Alternatively, the core may be impermeable for applications wherein a high pressure fluid is introduced into the hollow fibers. In each embodiment, a case encloses the core and fibers and provides a region for collecting fluid that has passed around or through the fibers. Although McLain discloses various cases and arrangements for winding fibers on a core (e.g., loose winding, winding fibers directly on the core, or winding fibers on other removable means, then inserting the core), there is no suggestion about providing concentric, radially spaced fluid or blood inlet and outlet manifolds on each side of a fiber bundle to achieve optimal delicate fluid handling characteristics, and the best transfer per unit area.

U.S. Pat. No. 4,424,190 (to Mather, III et al.) discloses a hollow fiber blood oxygenator for supplying oxygen to blood flowing on the outside of a plural layer mat of hollow fibers which carry oxygen inside the fiber lumens. Blood travels upwardly from the bottom end of the oxygenator into a central core with a porous wall, outwardly through the core along the length thereof into the mat and radially through the mat and then into an annular space between the inside of the outer wall of the oxygenator and the outer surface of the mat. A blood outlet for conducting the blood out of the space is at the bottom of the oxygenator.

The Mather, III et al. patent acknowledges it is undesirable to subject blood to unusual mechanically applied forces of stress (e.g., pressure drops) during its flow through an oxygenator, but there is no suggestion about providing a blood flow path wherein the radial flow outwardly from along the axis of a core is substantially the same all along the axis, and wherein the path is at least partially defined by a blood inlet manifold and a blood delivery outlet manifold having substantially equal lengths and volumes.

U.S. Pat. No. 4,975,247 (to Badolato et al.), and corresponding EPO document 0 187 708 B1 (also to Badolato et al.), discloses an axial flow hollow fiber blood oxygenator including a hollow support core around which hollow fibers are wound to form a bundle, and an outer casing. A gas entry port is coupled to the fibers at the first, top end of the bundle and a gas outlet is coupled to the fibers at the second, bottom end of the bundle. A blood inlet is at the bottom end of the bundle and a blood outlet is at the top, thereby providing an axial blood flow through the bundle parallel to the longitudinal axis of the core. Blood is introduced through the inlet and is directed by an angled dish portion of the support core into the bottom of the fiber bundle through a series of apertures. Similarly, blood exits the top of the fiber bundle through openings, flows into an annular blood passage and out a blood outlet. There is no suggestion about how to provide a radial blood flow path through a fiber bundle.

While the oxygenators disclosed in the preceding patents represent advances in the art, and while at least the Mather, III et al. patent recognizes that it is undesirable to subject blood to unusual mechanically applied forces of stress, such stresses have not been reduced to an optimal level by known oxygenators, nor has gas transfer been optimized. Another problem inadequately addressed, particularly in prior art radial flow oxygenators such as the Mather, III et al. device, is that blood reaching the blood outlet is not uniformly oxygenated because blood does not flow or dwell uniformly in all regions of the devices.

SUMMARY OF THE INVENTION

In accordance with the present invention, a radial flow, hollow fiber blood oxygenator is provided. The oxygenator broadly comprises a hollow fiber bundle wound around a supporting core, an outer housing, potting means for potting and sealing the ends of the fibers to the core and the housing, gas inlet and outlet means operably coupled to the fibers, and blood inlet and outlet means. The core, fiber bundle and housing are each generally cylindrical and concentrically arranged, forming an oxygenation chamber enclosing the fiber bundle. The chamber is defined by the outside wall of the core, the inside wall of the housing, and the potting means, and incorporates a blood providing inlet manifold and a blood collecting outlet manifold.

In use, the oxygenator is oriented vertically. Blood flows into the bottom, open end of the core, upwardly through the core and out a plurality of windows circumferentially located adjacent to the top end of the core. The blood is introduced into the core at a pressure sufficient to induce it to flow to the top of the core, and throughout the oxygenator. Passing through the windows, the blood then enters the circular inlet manifold adjacent to the core, fills it from top to bottom and flows radially through the fiber bundle over the outside of the fibers, into the generally circular outlet manifold adjacent to the housing and outside the fiber bundle. The blood then exits the oxygenator through a blood outlet at the bottom of the outlet manifold. Gas enters the oxygenator unit through a gas inlet cap at the top of the oxygenator, flows downwardly through the fibers forming the fiber bundle, and exits through a gas outlet cap at the bottom of the oxygenator. During operation of the oxygenator, oxygen enters and carbon dioxide leaves the blood via diffusion through micropores in the hollow fibers.

One of the objects of the present invention is to provide a radial flow mass transfer device which provides for uniform flow through regions of the device and optimizes mass transfer per unit area.

Another object of the present invention is to minimize, to the fullest extent possible, mechanically applied stress to fluids flowing through mass transfer devices.

Still another object of the present invention is to provide a radial flow, hollow fiber blood oxygenator wherein blood enters the oxygenator at the bottom, flows upwardly into a hollow core, into an inlet manifold, radially outwardly from the manifold through the radial extent of a hollow fiber bundle wound up core, and into an outlet manifold from which it exits the oxygenator.

A feature of the present invention is a blood flow path through a hollow fiber blood oxygenator provided by a first blood inlet into the bottom of a hollow core, a second blood inlet at the top of the core, an inlet manifold in a fluid communication with the second blood inlet, a fiber bundle, an outlet manifold radially spaced from the inlet manifold at the outside region of the bundle, and a blood outlet at the bottom of the outlet manifold, wherein the blood enters the inlet manifold at a point higher than that at which it is withdrawn, thereby following a generally U-shaped flow path, degassing the blood and avoiding non-uniform flow rates through the oxygenator.

A specific feature of the hollow fiber mass transfer device of the present invention is a core having a first end, a second end and an axis extending from the first end to the second end. In use, the axis is oriented vertically. The core has a lumen and provides a turnaround region for the blood flow adjacent to an open end of the lumen at an uppermost chamber with one or more windows open to the exterior surface of the core, whereon the core includes relieved regions for receiving blood from the lumen through the windows. The exterior surface of the core has a plurality of circumferentially equally spaced ribs for supporting a fiber bundle away from the outside surface of the lumen of the core, and relieved regions defined by and disposed between the ribs for providing the inlet manifold.

Advantages of the present invention are that it degasses the blood as the blood flows through it, and it provides for a uniform flow through various regions of the device to promote the best gas transfer per unit area.

Further objects, features and advantages of the present invention will be understood with reference to the following specification and to the appended drawings and claims.

BRIEF DESCRIPTION OF THE DRAWINGS

FIG. 7 is a schematic representation of the winding apparatus for the winding method of the present invention wherein a fiber or ribbon of fibers is wound on the core showing the wind angle;

FIG. 8 is a schematic representation of an alternative winding method for forming a fiber bundle comprising layers of fiber mats; and FIG. 9 is a schematic representation showing a fiber guide adapted for variable spacing between fibers.

DETAILED DESCRIPTION OF THE PREFERRED EMBODIMENT

Figure 1:
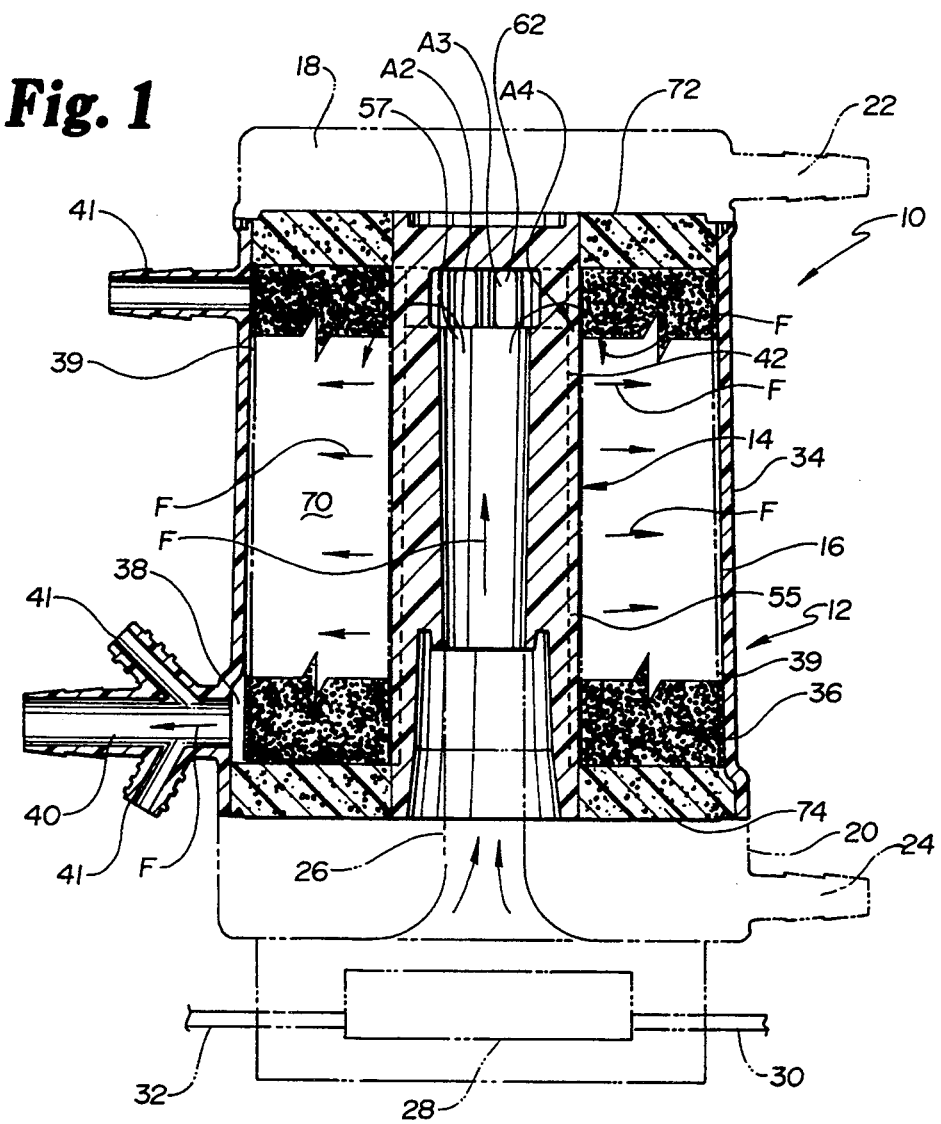
FIG. 1 is a cross-sectional view of the oxygenator of the present invention, depicting the oxygenator vertically oriented as it would be in use.

Referring to the drawings, particularly FIG. 1, the blood oxygenator 10 in accordance with the present invention comprises a cylindrical outer housing 12, a generally cylindrical inner support core 14. A gas header or cap 18, including a gas inlet 22, is fitted at the top of the oxygenator 10. Similarly, a bottom header or cap 20, including a gas outlet 24, is fitted to the bottom of the oxygenator 10. The bottom header also includes a blood entrance 26 for providing a blood flow into the oxygenator 10.

The oxygenator 10, at the bottom header 20 also may be provided with, or carry a suitable heat exchanger 28. A fluid type heat exchanger 28 is depicted with an inlet 30 and an outlet 32, but other suitable heat exchange devices might be incorporated with the oxygenator 10, for example, an electrical heating and cooling device might be used.

The outer casing 12 has a generally cylindrical outermost peripheral wall 34, open at both ends prior to assembly of the oxygenator 10. At the base region 36, the inside of the wall 34 of the outer housing 12 includes an annular eccentric relieved area 38 in a circular outlet manifold 39 adjacent to the wall 34. A blood outlet 40 is at the bottom of the manifold 39. Other outlets or ports, such as sampling or recirculation ports 41 may be suitably located on the oxygenator 10.

Figure 2:
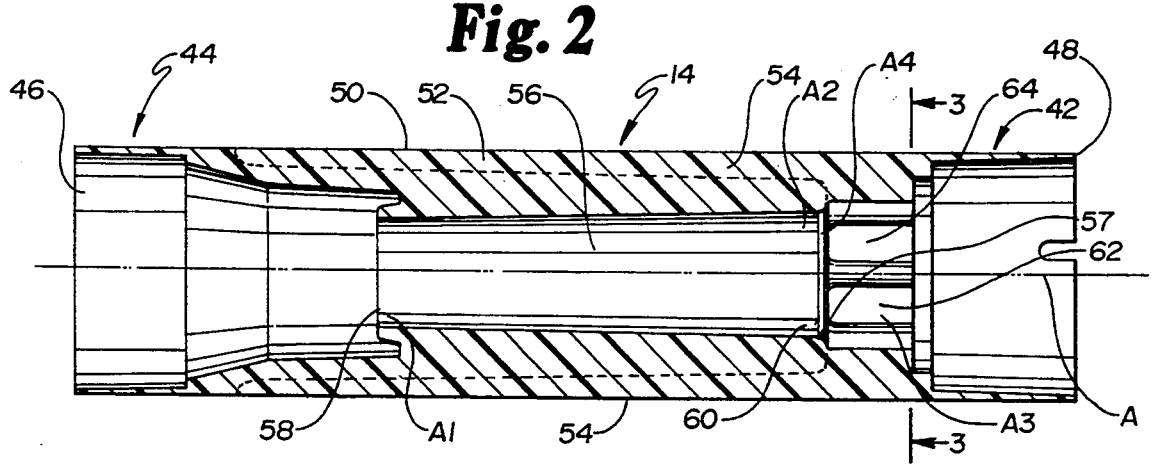
FIG. 2 is a longitudinal cross-sectional view of the core mandrel for use in the oxygenator of the present invention.
Figure 3:
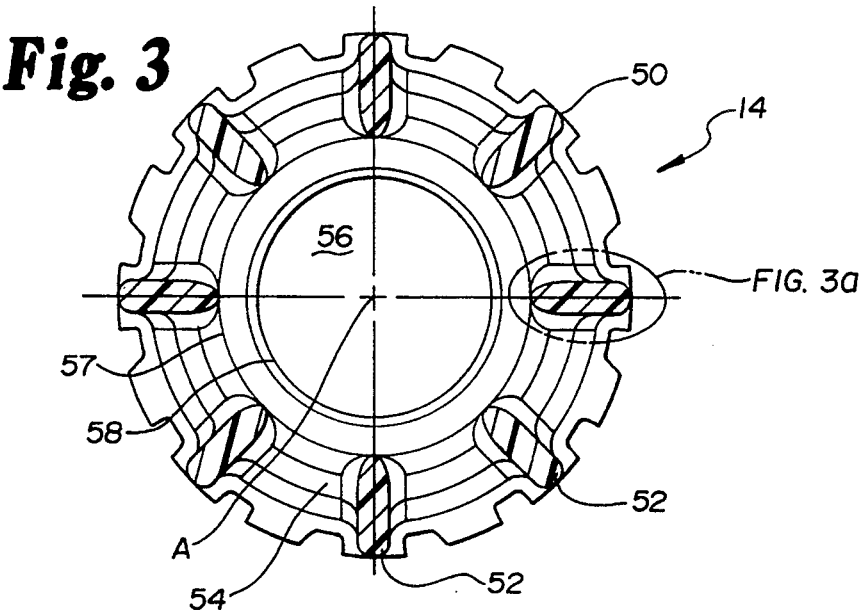
FIG. 3 is a cross-sectional view of the core mandrel taken along line 3—3 of FIG. 2.
Figure 3A:
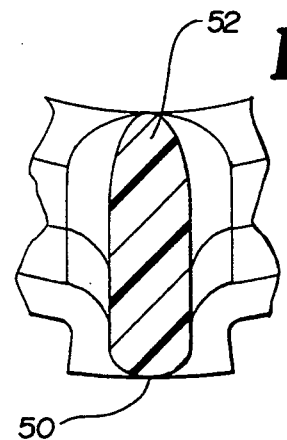
FIG. 3a is a fragmentary detail of one of the ribs of the core of the present invention taken from the encircled area in FIG. 3.

Referring to FIG. 2, the inner support core 19 is generally cylindrical with a first top end 42, a second bottom end 44 and a longitudinal axis A extending between the ends. At each end 42, 44, the core 14 carries disposable removable support flanges 46, 48, respectively. Referring to FIG. 3a, the outer diameter of the core 14 is defined by the outermost surface 50 of each of a plurality of ribs 52. The ribs 52 are generally parallel to the core axis A and to each other, and extend for the length of the core 14 between the disposable, removable support flanges 46, 48. Between each pair of ribs 52, the core 14 has a relieved or recessed inlet manifold region 54. Two such regions 54 are apparent in FIG. 2, and the regions and ribs (including others not shown in FIG. 2, but seen in FIG. 3) are equally spaced or disposed in an alternating fashion about the entire outer circumference of the core, as shown in FIG. 3. Although discrete recessed inlet manifold regions 54 are shown and each forms one section of a generally circular inlet manifold 55 surrounding the core 14, the regions 54 could be in fluid communication, or a continuous inlet manifold could be formed by providing only intermittent raised portions on the core 14.

The core includes a lumen 56 defined by the inside wall of a thickened generally central portion of the core 14 along the core axis. One end of the lumen 56 comprises a blood inlet 58 and is designed to be mounted on the blood fitting 26 of the bottom cap 20. The other end of the lumen is an open end 60 and is in fluid connection with a chamber 62 defined by the ribs extending past the chamber to the end of the core. The chamber 62 has one or more window openings 64 between the ribs 52. The windows 64 are disposed between the ribs about the entire circumference of the core and are in fluid communication with the recessed or relieved inlet manifold regions of the core. Although a plurality of discrete windows 64 are depicted, a single annular window, a plurality of perforations in a ring or other opening arrangement may be used, as long as the interior of the lumen is fluidly connected to the inlet manifold 55.

The outside surface of the core 14 between the ribs 52 tapers outwardly from the top end 42 adjacent the windows 64 toward the bottom end 44 to a widest point adjacent to the blood inlet 58. Conversely, the lumen 56 tapers inwardly from the top end 48 of the core 14 adjacent the windows 64 to a narrowest diameter adjacent the blood inlet 58.

The following calculations reflect relative cross-sectional areas including the cross-sectional areas available for blood flow through core portions. The reference points A2, A3, A4 are depicted in FIGS. 1 and 2 and indicate the cross-sections adjacent to the top end of the lumen 56, the windows 64 and the top end of the inlet manifold, formed by the plurality of relieved regions 54, respectively. $A_1$ is the area adjacent to the blood inlet 58. $A_1=0.249$ square inches, $A_2=0.346$ square inches, $A_3=0.331$ square inches and $A_4=0.504$ square inches.

$\dfrac{A_3}{A_2}$ should be between 0.5 and 1.5, with a preferred value of .957

$\dfrac{A_4}{A_3}$ should be between 0.7 and 1.7, with a preferred value of 1.522

Referring back to FIG. 1, an annular bundle 70 of helically wound, microporous hollow fibers is positioned in a space defined by the outermost extent of the ribs 52 on the support core 14 and the wall 34 of the outer housing 12. The outlet manifold 39 is formed by the gap between the radially outermost region or surface of the bundle 70 and the inside of the wall 34 of the housing 32. The fiber bundle 70 is formed in accordance with the method described below. After being formed, the top and bottom ends of the bundle 70 are embedded in a solidified potting composition at the top and bottom ends of the oxygenator to define, along with the housing 12 and the core 14, an enclosed chamber. The fiber lumens communicate with the outer surface of the upper, top and lower, bottom potted portions 72, 74, respectively. An oxygenating gas introduced via gas inlet 22 flows into the top cap 18, through the lumens of the hollow fibers, down to the opposite ends of the hollow fibers at the lower potted region 74, and into the gas outlet passage 24.

Figure 5:
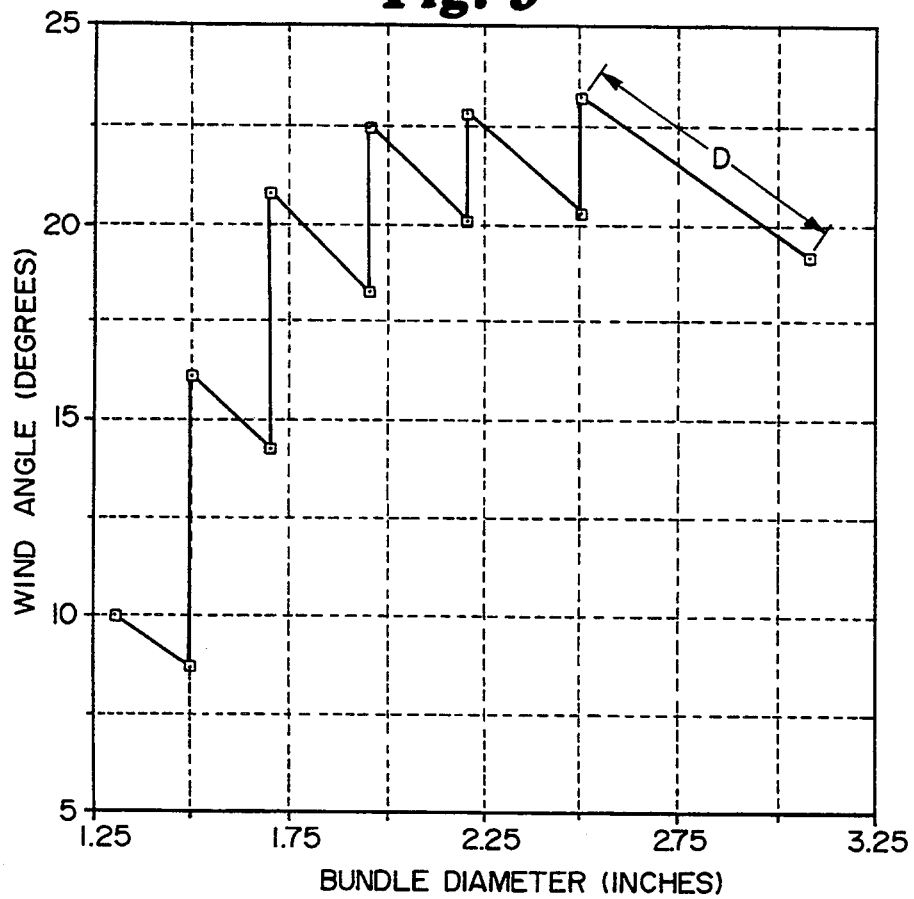
FIG. 5 is a graph depicting fiber wind angle as a function of bundle diameter.
Figure 6:
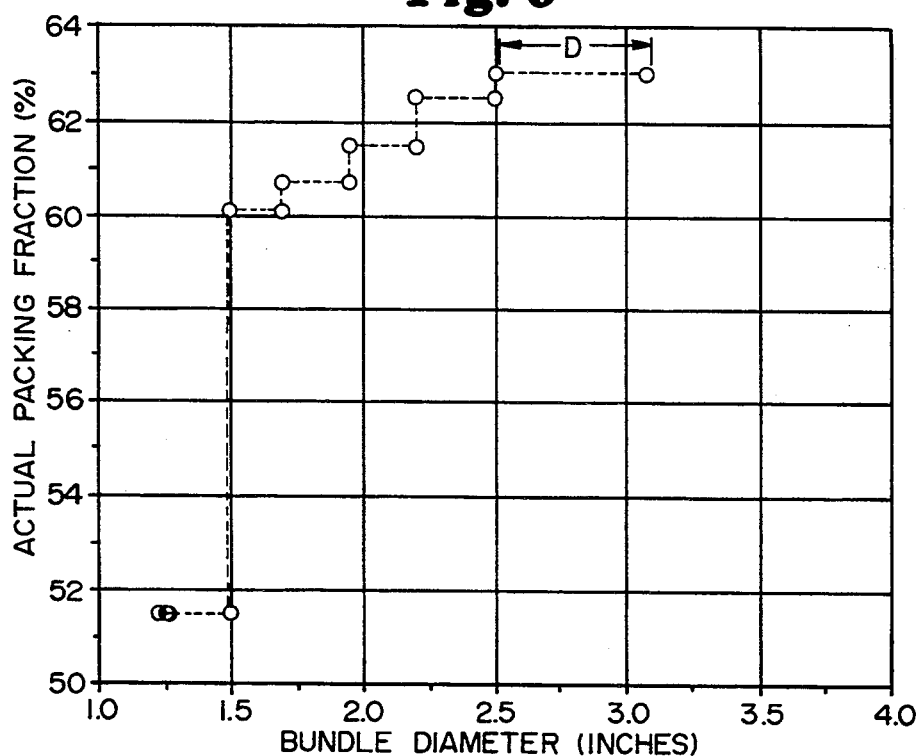
FIG. 6 is a graph depicting actual packing fraction verses bundle diameter.

The fiber bundle 70 may be formed by following a method for helically winding continuous semi-permeable hollow fiber on the support core 14 to produce the hollow fiber bundle 70 for use in the radial flow mass transfer device according to the present invention. The steps and apparatus for the method are represented and depicted in FIGS. 4–9. Generally, a winding apparatus is provided which has a rotatable mounting member having a longitudinal axis and a fiber guide adjacent said mounting member. The fiber guide is adapted for reciprocal movement along a line parallel to the longitudinal axis of said mounting member as the mounting member rotates. The support core 14 is mounted for rotation on the rotatable mounting member. At least one continuous length of semi-permeable hollow fiber is provided where the hollow fiber is positioned by said fiber guide and secured to said support core 14. The mounting member is rotated and the fiber guide is moved reciprocally with respect to the longitudinal axis of the mounting member. Fiber is wound onto said support core 14 to form the hollow fiber bundle which extends radially outward relative to the core axis A and has packing fractions which increase radially outwardly throughout a major portion of said hollow fiber bundle 70, thereby providing a packing fraction gradient. FIGS. 5 and 6 show the packing fraction as it relates to the fiber bundle diameter.

The foregoing method may involve two or more fibers positioned by the fiber guide. The two or more fibers are wound onto the support core 14 to form a wind angle relative to a plane parallel to the axis of the support core 14, tangential to the point at which the fiber is wound onto said support core 14 and containing said fiber.

FIG. 7 illustrates the wind angle for a single fiber, but would apply as well for each of two or more fibers. Fiber 92 is contained in plane 93. Plane 93 is parallel to the axis A of core 14. Plane 93 is tangential to point 94 at which fiber 92 is wound onto core 14. Line 95 is perpendicular to axis A and passes through point 94 and axis A. Line 96 is a projection into plane 93 of the normal line 95. Wind angle 97 is measured in plane 93 between projection line 96 and fiber 92.

Alternatively, line 92 in tangential plane 93 is a projection into plane 93 from a fiber (not shown) which lies outside of plane 93.

The wind angle may be increased by increasing the distance through which the fiber guide moves during one rotation of the mounting thereby providing said increasing packing fraction. The wind angle may be decreased, increased or otherwise varied outside of the major portion of the bundle. The wind angle will be considered to have increased in the major portion of the bundle if on average it increases even though it may vary including decreasing.

The winding method may further involve tensor means for regulating the tension of said fiber as it is wound. The tension of said fiber may be increased throughout a major portion of such winding thereby providing said increasing packing traction. The fiber guide may be adapted to regulate the spacing between two or more fibers being simultaneously wound and the spacing may be decreased throughout a major portion of such winding thereby providing said increasing packing fraction.

The above-outlined procedure for spirally winding semi-permeable hollow fiber on a supporting core 14 for use in the blood oxygenator in accordance with the present invention is set forth in U.S. Pat. No. 4,975,247 at column 9, line 36 through column 11, line 63, including FIGS. 12 through 16A, all of which are incorporated herein by reference thereto for showing the following winding procedure.

Figure 4:
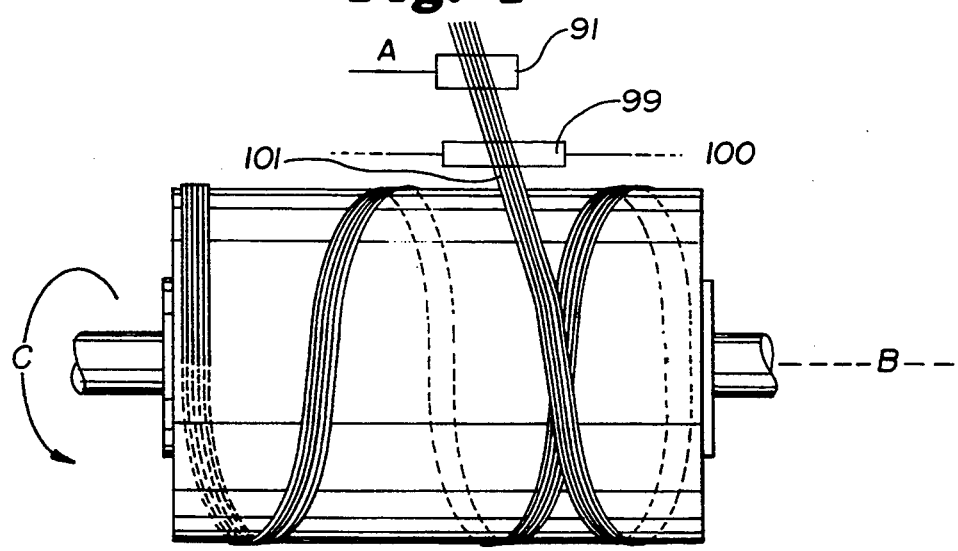
FIG. 4 is a schematic view of the support core showing the hollow fiber ribbon being wound on the core in an early stage of the winding process.

The hollow fiber winding process may be conveniently performed on an apparatus of the type illustrated schematically in FIG. 4. The fiber winding apparatus comprises a rotating mounting member and a fiber guide 91 which travels reciprocally as illustrated by double-headed arrow A in FIG. 4 with respect to the longitudinal axis B, i.e., along line A which is parallel to the axis of rotation B of the mounting member. The fiber guide contains a number of tubes, not illustrated in FIG. 4, but shown in FIG. 9, through which the fibers are threaded as they enter the guide from a supply container. Alternatively, ribs, grooves or pins may be used. Commercially available winding apparatus are suitable for wrapping a continuous hollow fiber (or a number of such hollow fibers) on the support core. FIG. 8 shows an alternative method for making a fiber bundle wherein a two-ply fiber mat 115 is rolled onto a core.

The core 14 described above is spirally wound with hollow fibers in the following manner. The inner support core 14 is mounted on mounting member 90 of the winding apparatus. Guide 91 is then positioned at the left hand side (as viewed in FIG. 4) of the extended core. A ribbon of six continuous semi-permeable hollow fiber is constructed from spools of single-stranded fiber in known ways and threaded through the guide tubes of fiber guide 91. Six such guide tubes are used, one continuous hollow fiber being placed between two adjacent pins in order to separate the fibers as they leave the supply container. The leading end of the fiber ribbon is affixed to the outer surface of the core 14 at the far left end of the core 14. Rotation of mounting member 90 of the winding apparatus is begun in the direction indicated by arrow C in FIG. 4. Guide 91 is geared to mounting member 90 and automatically travels axially of the core 14 as mounting member 90 rotates. It will be recognized by those skilled in the art that guide 91 travels axially a fixed distance for each revolution of mounting member 90.

Guide 91 travels from the first end (left hand side of FIG. 4) of the core to the second end (right hand side of FIG. 4) where it decelerates. After decelerating, the guide reverses direction and travels back to its starting position. After decelerating again and reversing direction, the guide begins its travel cycle anew. This reciprocal travel for guide 91 and the concurrent rotation of mounting member 90 on which the extended support core 14 has been mounted is continued, subject to the following described alteration, until a fiber bundle of desired diameter has been wound onto the extended core.

As described more fully in columns 10–11 of the '247 patent, in the left-to-right travel of guide 91, the fiber ribbon was wound spirally around the extended support core 14 and the individual fibers in the ribbon were laid down in contact with the outer surfaces 50 of the support core ribs 52. In the subsequent second traverse (right-to-left in FIG. 4) of guide 91, fiber ribbon continues to be spirally wound onto the extended core 14. Portions of the six fibers laid down during the second traverse of the fiber guide contact fibers at certain crossover points. Except for these crossover points at which there is fiber-to-fiber contact with fibers laid down during the first traverse of guide 91, the fibers laid down during the second traverse of the fiber guide come into direct contact with the outer surface 50 of the core 14. In the known winding procedure being discussed, the core 14 is covered, except for the spacing between adjacent fibers and the distance between the sixth fiber of one ribbon and the first fiber of the next adjacent ribbon, when the fiber guide has traveled a sufficient number of traverses. Fibers of the fiber ribbon laid down a later traverse of the fiber guide will be in radial registry with fibers laid down during an earlier traverse of the fiber guide as taught in the art including the '247 patent at column 11, line 13 through line 45.

In operation, the oxygenator 10 is in a generally vertical position such as that depicted in FIG. 1, which includes arrows F depicting the blood flow path through the oxygenator 10. Blood to be oxygenated is introduced into the core 14 through the entrance 26 of the bottom cap 20 and through the blood inlet end 58 of the core 14. The blood flows upwardly into the lumen 56 of the core 14 toward the circumferential rib and window array at the uppermost end of the core 14. The blood flows through the windows 64, over the rounded lip 57 of the lumen 56 and into the plurality of recesses or relieved regions filling each individual inlet manifold 54, the group of such manifolds forming the inlet manifold 55. Each manifold is defined by the space between the ribs 52 and the radially innermost region of the fiber bundle and the outside surface of the lumen 56 of the core 14. From the inlet manifold, the blood flows radially away from the core 14, all along the length of the core 14 between the upper and lower potted regions 72, 74, or in other words, all along the length of the ribs 52, or all along the length of the relieved areas between the ribs less the length of the windows 64. The blood flows through the bundle radially over the outside of the fibers and enters the outlet manifold 39 evenly along the length from the top to the bottom thereof. The blood collects in the outlet manifold, particularly in the eccentric collection region 38 adjacent the base of the oxygenator 10, and exits the oxygenator 10 through the blood outlet 40.

Gas enters the oxygenator unit 10 through the gas inlet 22 and flows from inside of the cap 18 into and through the hollow fibers comprising the bundle 70, into the chamber defined by the bottom cap 20 and out the gas outlet 24. Gas exchange takes place via diffusion through micropores in the hollow fibers as the radial blood flow and the gas flow generally perpendicular to the blood flow is occurring.

In an oxygenator, without attached optional heat exchanger, having a membrane area of about 2.50 $m^2$ and prime volume of 200 ml, the following results were obtained for blood and ventilating gas flow rates of 7 lpm.

| | |
|---|---|
| $O_2$ transfer rate | 430 ml/min |
| $CO_2$ transfer rate | 350 ml/min |
| Blood path $\Delta P$ | 60 mm Hg |
| Gas path $\Delta P$ | 7 mm Hg |

It should be understood that the potting process referred to hereinabove is a well known fiber potting process wherein the preferred potting material is polyurethane introduced by centrifuging and reacted in situ. Other appropriate potting materials may be used. Suitable sealants and gaskets may be used at joints in the present invention, such as the joints between the top and bottom caps 18, 20 and the outer housing 12. The outer housing 12, the various inlet and outlet nozzles 40, 41, etc., and the top and bottom caps 18, 20 may be formed from suitable polycarbonate, one example being the polycarbonate MAKROLON®, from Miles, Inc., Elkhardt, Ind. Similarly, any suitable microporous fiber may be used in the mass transfer device of the present invention depending upon the particular application. In the case of the preferred embodiment, a blood oxygenator, a suitable fiber is the microporous polypropylene fiber denoted X-10, made by Hoechst-Celanese.

What is claimed is:

1. A method of oxygenating blood in a generally vertically disposed, radial flow, hollow fiber blood oxygenator, said oxygenator including a hollow fiber bundle wound on a hollow core, said core having an interior lumen, radially spaced inlet and outlet manifolds surrounding the hollow fiber bundle, and means for providing blood only from the top of the interior lumen only to the inlet manifold, the oxygenator, bundle, core, lumen, and manifolds having corresponding top and bottom ends, said method comprising:

introducing blood into the interior lumen at the bottom of the core at a pressure sufficient to induce blood flow to the top of the lumen;

delivering blood from the top of the lumen, through the providing means only, and into the inlet manifold;

providing a blood flow from the inlet manifold along the length thereof into and radially outward through the bundle and into the outlet manifold along the length thereof; and providing a blood outlet at the bottom of the outlet manifold for allowing blood to exit the oxygenator.

2. A hollow fiber mass transfer device, comprising:

a hollow fiber bundle wound around a supporting core, said core comprising a first end, second end and an axis extending from said first end to said second end, said hollow fiber bundle comprising hollow, gas permeable fibers each having a first end, a second end and a hollow interior, wherein the first ends of said fibers are adjacent the first end of said core and the second ends of said fibers are adjacent the second end of said core, said core further comprising: (i) an exterior surface having a plurality of ribs for supporting the fiber bundle and relieved regions disposed between the ribs for providing a first fluid to a radial inward region of the fiber bundle, and (ii) means for providing the first fluid to the relieved regions;

an outer housing surrounding said hollow fiber bundle, said outer housing having collector means for collecting blood from a radially outward region of said hollow fiber bundle;

first potting means for potting the first ends of said fibers and for sealing said fibers to said core and housing;

second potting means for potting the second ends of said fibers and for sealing said fibers to said core and housing, wherein said first and second potting means, core and housing define an enclosed chamber;

a second fluid inlet operatively connected to the interior of said fibers at one of said first ends and second ends and a second fluid outlet operatively connected to the interior of said fibers at the other of said first ends and second ends; and a first fluid inlet means operatively connected to the core and a first fluid outlet means operatively connected to the collector means, for compelling first fluid flowing between the first fluid inlet means and first fluid outlet means to flow substantially radially outward through the hollow fiber bundle.

3. A hollow fiber mass transfer device according to claim 2, wherein the length of the ribs is substantially equal to the distance between the first and second potting means.

4. A hollow fiber mass transfer device according to claim 3, wherein the length of the relieved regions is substantially equal to the distance between the first and second potting means less the length of the means for providing the first fluid to the relieved regions.

5. A hollow fiber mass transfer device according to claim 2, wherein said core further comprises a lumen having an open end in fluid communication with the means for providing the first fluid to the relieved regions, said means for providing the first fluid comprising a chamber at the open end of the lumen, said chamber having one or more windows open to the relieved regions for allowing the first fluid to flow from the lumen through the chamber and the one or more windows and into the relieved regions.

6. A hollow fiber mass transfer device according to claim 5, wherein there is a relieved region for each of the one or more windows and in discrete fluid communication therewith.

7. A hollow fiber mass transfer device according to claim 5, wherein the ratio of the cross-sectional area of the lumen adjacent to the open end thereof and the aggregate of the cross-sectional areas of the one or more windows is in the range of 0.5 to 1.5.

8. A hollow fiber mass transfer device according to claim 7, wherein the ratio is about 1.

9. A hollow fiber mass transfer device according to claim 5, wherein the ratio of the cross-sectional area of the aggregate of the relieved regions to the aggregate of the cross-sectional areas of the one or more windows is in the range of 0.7 to 1.7.

10. A hollow fiber mass transfer device according to claim 9, wherein the ratio is 1.5.

11. A hollow fiber mass transfer device according to claim 2, wherein the means for providing the first fluid to the relieved regions is adjacent to one of the first and second ends, and the first fluid outlet means is adjacent to the other of said ends.

12. A hollow fiber mass transfer device according to claim 2, wherein the length of the relieved regions is substantially the same as the length of the radially outward region of said hollow fiber bundle.

* * * * *